United States Patent [19]

Mock

[11] Patent Number: 5,699,617
[45] Date of Patent: Dec. 23, 1997

[54] MULTIPLE PURPOSE COMPOUND ACTION SNIPS

[75] Inventor: Mel Corrie Mock, Rocky Ford, Ga.

[73] Assignee: Cooper Industries, Houston, Tex.

[21] Appl. No.: 609,690

[22] Filed: Mar. 1, 1996

[51] Int. Cl.⁶ .................................................. B26B 13/16
[52] U.S. Cl. ................................. 30/252; 30/193; 30/254
[58] Field of Search ........................... 30/187, 191, 192, 30/193, 254, 283, 230, 231

[56] References Cited

U.S. PATENT DOCUMENTS

| | | | |
|---|---|---|---|
| 1,046,852 | 12/1912 | Prince | 30/252 |
| 1,287,754 | 12/1918 | Robertson . | |
| 1,862,033 | 6/1932 | Porter | 30/252 X |
| 1,931,569 | 10/1933 | Brown . | |
| 2,005,694 | 6/1935 | Vosbikian et al. . | |
| 2,295,385 | 9/1942 | Connors . | |
| 2,528,815 | 11/1950 | Boyer . | |
| 3,324,549 | 6/1967 | Sharpe . | |
| 3,372,478 | 3/1968 | Wallace et al. . | |
| 3,422,532 | 1/1969 | Ballard . | |
| 3,638,307 | 2/1972 | Stewart . | |
| 3,762,048 | 10/1973 | Carter . | |
| 3,851,389 | 12/1974 | Swanson . | |
| 4,079,513 | 3/1978 | Harrison . | |
| 4,463,497 | 8/1984 | O'Keeffe . | |
| 4,502,222 | 3/1985 | Sargent . | |
| 5,003,695 | 4/1991 | Lipscomb et al. . | |
| 5,267,400 | 12/1993 | Danube et al. . | |

FOREIGN PATENT DOCUMENTS

| | | | |
|---|---|---|---|
| 0 746 972 | 5/1996 | European Pat. Off. . | |
| 181669 | 8/1921 | United Kingdom | 30/252 |

*Primary Examiner*—Douglas D. Watts
*Attorney, Agent, or Firm*—Burns, Doane, Swecker & Mathis, L.L.P.

[57] ABSTRACT

A compound action snips includes a pair of handles mutually connected at a handle pivot and a pair of cutting blades connected to the handles. The blades each having a proximal end attached to a distal portion of one of the handles, and the blades are mutually connected at a blade pivot, so that converging movement of the handles causes converging movement of the blades. The blades have a cutting length in a range of 2.5 to 3.5 inches and a functional handle length of about 5.8 inches. The snips have a ratio of cutting length to overall snips length in a range of about 0.24 to 0.33, and a ratio of cutting length to handle length in a range of about 0.4 to 0.6. In addition, the ratio of the cutting length to the angular range of motion of the handles is in the range of about 0.05 to 0.09 inches/degree for a handle range of movement of 40° to 50°.

17 Claims, 4 Drawing Sheets

MULTIPLE PURPOSE COMPOUND ACTION SNIPS

BACKGROUND AND SUMMARY

Compound action cutting snips typically include a pair of handles connected to a pivot point and a pair of blades pivotally mounted on the handles and pivotally connected to each other at a separate pivot point. The compound action of the pivoting handles driving the pivoting blades of this type of snips provides for relatively greater force at the cutting blades than is produced by single pivot snips.

One type of compound action snips, aviation snips, are commonly used for cutting sheet metal. Aviation snips by convention have a cutting length of 1 to 1.5 inches in straight-line cutting snips, and a cutting length of about 1.75 inches for curved cutting snips. The maximum cutting length is believed to represent a limit imposed by the force required to close the ends of the blades through the material.

The relatively short cutting length of aviation snips makes them inconvenient for use for other materials where long cuts must be made, for example, cutting thin sheet material such a vinyl siding. Tinner snips, which are used for material such as vinyl siding, are single pivot tools that have relatively long handles and blades. These are heavy and can be difficult for a worker standing on a ladder to manipulate.

The present invention provides general purpose snips that can be used for a variety of materials. It has been found that a cutting snips can be provided with a more efficient cutting action without significant loss of cutting force at the blade tips by the arrangement of the cutting blades and handles described in more detail below.

The snips according to the present invention include a pair of handles mutually connected at a handle pivot, and a pair of cutting blades, each blade having a proximal end pivotally attached to a distal portion of one of the handles, and the blades being mutually connected at a blade pivot so that converging movement of the handles causes converging movement of the blades.

According to the invention, the blades have a maximum cutting length of at least 2.5 inches, and preferably in a range of 2.5 to 3.5 inches, and more preferably 2.75 inches. A ratio of the maximum cutting length to a length of the handles is at least 0.4. This relationship provides a tool that is easily handled and has an unexpected cutting efficiency throughout the range of cutting action.

According to another aspect of the invention, a ratio of the maximum cutting length of the blades to the length of the handles is at least 0.4 and preferably in a range of about 0.4 to 0.6.

According to yet another aspect of the invention, the handles are at a proximal portion of the snips, the blades correspondingly being at a distal portion of the snips, and the handle pivot is located proximal to and spaced from the blade pivot.

The blades may be both formed with honed cutting edges. Alternatively, a first of the blades may be formed with a serrated anvil surface substantially perpendicular to the first blade edge. The serrated anvil surface provides means for gripping a workpiece, and a second of the blades is formed with a honed cutting edge that moves against the edge of the anvil to cut the workpiece.

The snips according to the invention provides a cutting action that is more efficient that conventional compound action snips by virtue of the geometry of the blades and handles. The movement of the handles, which changes the relative orientation of the blades, causes a change in the effective cutting length, that is, the distance from the point at which the blade edges cross to the tips of the blade. The snips according to the invention are configured so that a ratio of the change in effective cutting length to angular movement of the handles is at least 0.05 inches/degree and more preferably in a range of 0.05 to 0.09 inches/degree. This more than 50% greater than the corresponding ratio in conventional snips and provides an advantage in using the snips.

According to the present invention, the geometry of the snips provides a ratio of a linear distance between tips of the blades in the open position and a linear distance between free ends of the handles in the open position that is at least 0.35.

BRIEF DESCRIPTION OF THE DRAWINGS

The invention will be better understood through the following description read in conjunction with the appended drawings, wherein.

DETAILED DESCRIPTION

Figure 1:
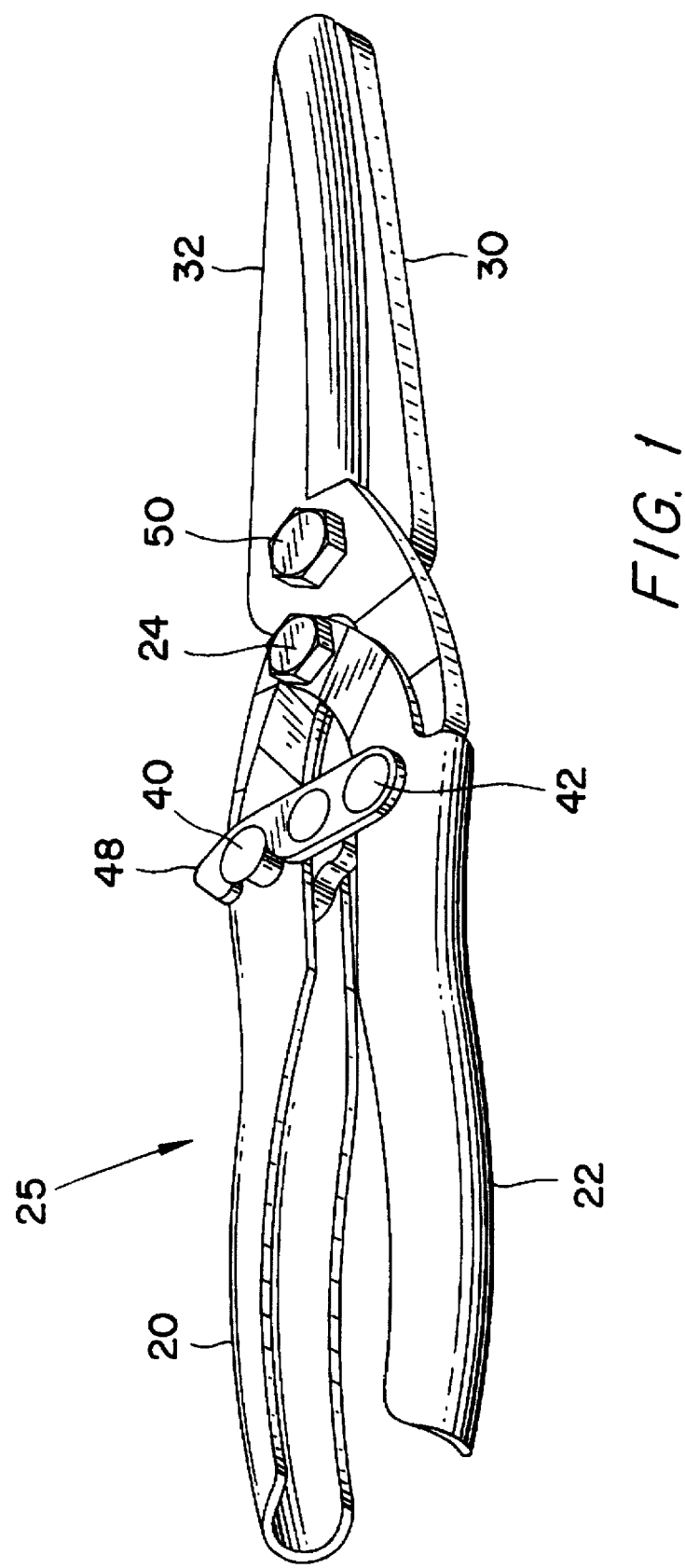
FIG. 1 is a perspective view of snips in accordance with the invention.
Figure 2:
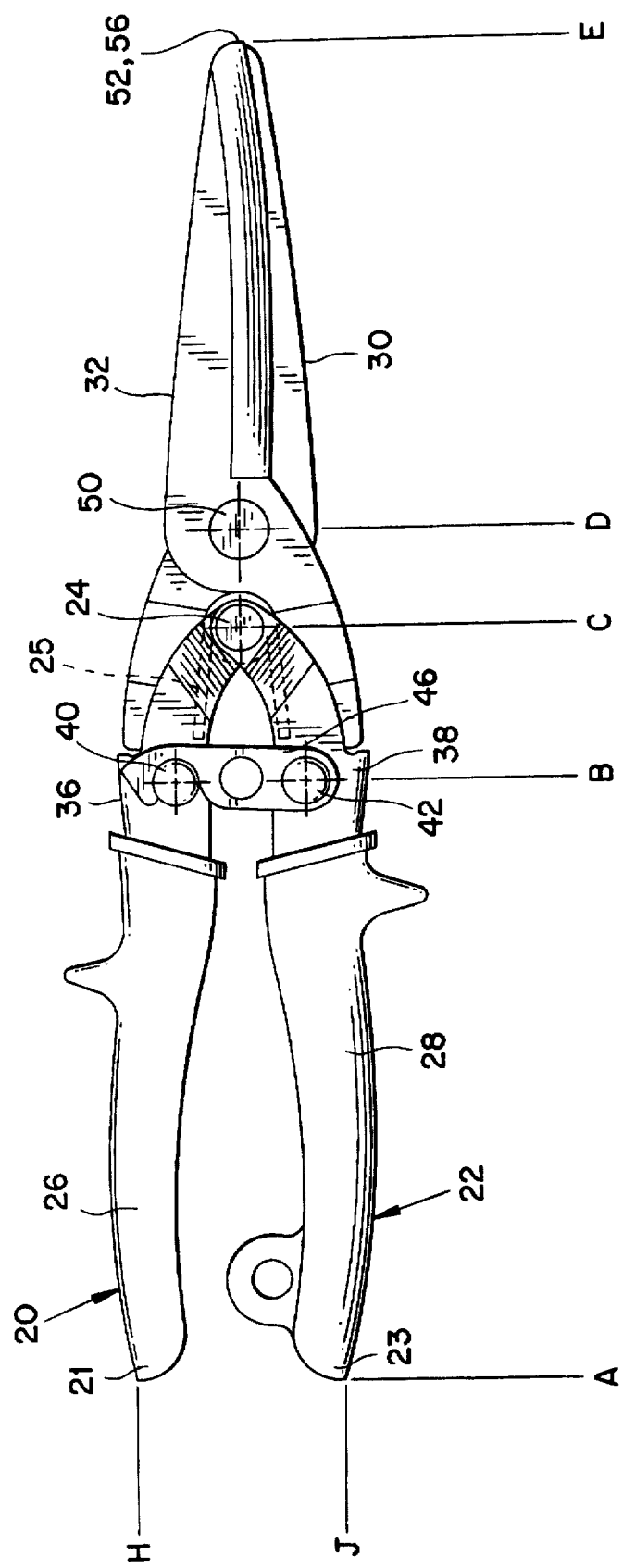
FIG. 2 is a front view of the snips of FIG. 1 in a closed position.

FIG. 1 is a perspective view and FIG. 2 is a front view of cutting snips in accordance with the present invention. The snips include a pair of handles 20, 22 connected at a handle pivot 24. The handle pivot 24 may comprise a bolt, as shown in the figures, or any suitable fastener. As shown in FIG. 2, the handles 20, 22 may include grip covers 26, 28 of a suitably soft material. For the purposes of this description, the handles 20, 22 define a proximal portion 25 of the snips.

A pair of cutting blades 30, 32 are mounted to distal portions 36, 38 of the handles 20, 22 by bolts 40, 42 which permit relative rotation between the blades and the respective handle. A latch 48 is mounted to one of the blade mounting bolts 42 for holding the snips in a closed position, as illustrated in FIG. 2.

Figure 3:
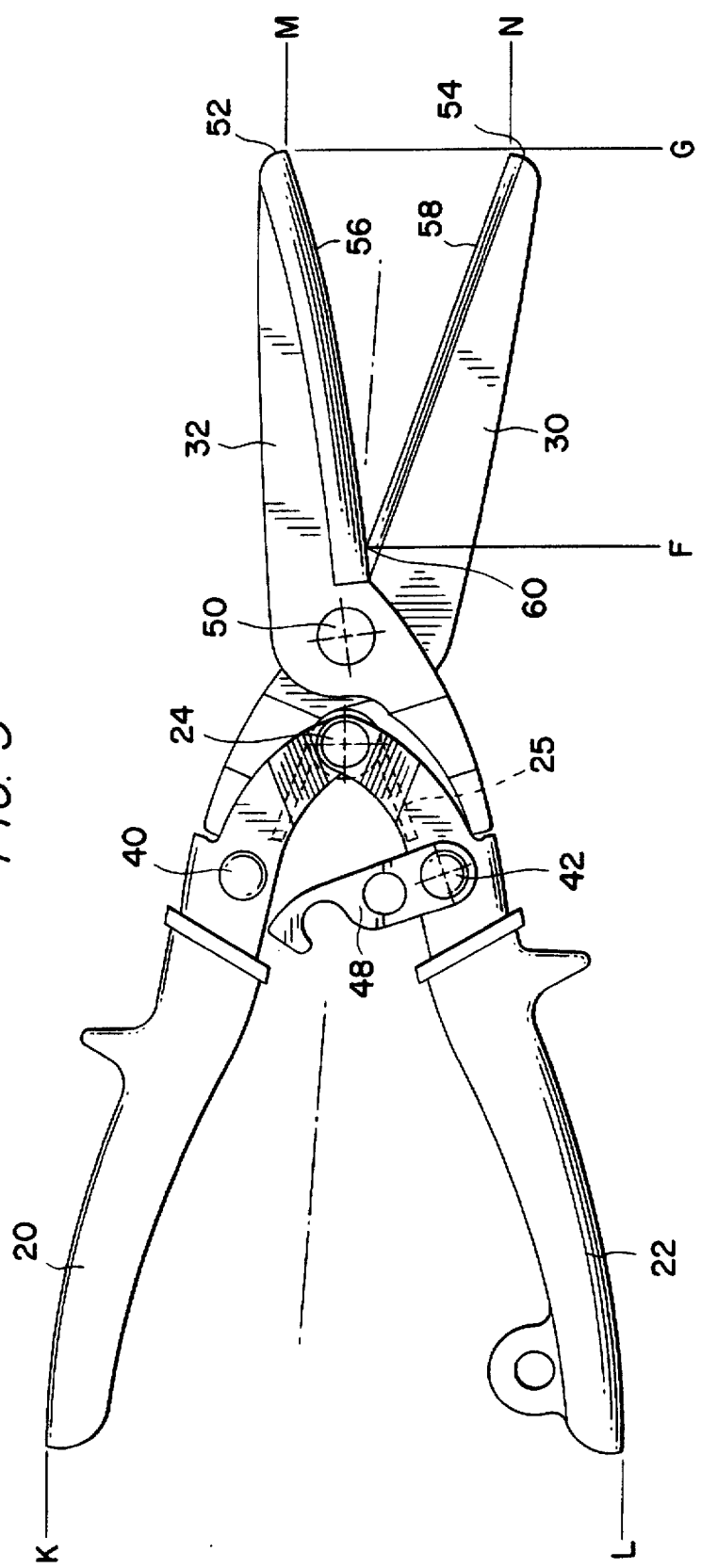
FIG. 3 is a front view of the snips in an open position.

The blades 30, 32 are mutually connected at a blade pivot 50 which allows relative pivoting movement of the blades. The blade pivot 50 is located distally of the handle pivot 24. As shown in FIG. 3, the snips have an open position in which the handles 20, 22 and the blades 30, 32 are diverging from each other relative to the respective pivots 24, 50. As may be understood by reference to the drawings, converging movement of the handles 20, 22, which is applied by the user, causes converging movement, that is, the cutting movement, of the blades 30, 32.

A spring 25 is mounted at the handle pivot 24 and acts on the handles 20, 22 to bias the handles to the open position.

The blades 30, 32 have a cutting length 62 defined as the axial distance from the tips of the blades 52, 54 to the point 60 at which the blade edges 56, 58 cross. As the blades 30, 32 are moved from the open position of FIG. 3 toward the closed position of FIG. 2, the cross point 60 correspondingly moves toward the tips 52, 54 and the effective cutting length is accordingly reduced until the tips converge.

The overall length of the snips is defined as the axial distance from the butts 21, 23 of the handles to the tips 52, 54 of the blades, indicated as the axial distance A to E in FIG. 2. The handle length is the axial distance A to C, that is, from the handle butts 21, 23 to the handle pivot 24. The blade length is the axial distance D to E from the blade pivot 50 to the blade tips 52, 54.

As may be understood by reference to FIGS. 2 and 3, the handles 20, 22 move through a predetermined angular range, and the butts 21, 23 through a predetermined distance, between the closed position H to J shown in FIG. 2, and the open position K to J of FIG. 3. According to a preferred embodiment, the distance K to L is about 5.38 inches and the distance H to J is about 1.25 inches, resulting in a closing distance of about 4.13 inches. The handles are designed to fit the human hand, and the range of angular movement of the handles is selected to correspond to the useful range of motion of the hand from open to closed while holding the handles. The geometry of the snips has been established so that the action of the blades 30, 32 in conjunction with handle movement provides for efficient cutting over a longer cutting length than in conventional compound action snips. In addition, there is sufficient closing force as the tips 52, 54 move toward convergence to make the tool useful for cutting a variety of materials.

According to the invention, the maximum cutting length, that is, the cutting length with the blades in the widest open position (F to G in FIG. 3), is at least 2.5 inches. Preferably, the maximum cutting length is in a range of 2.5 to 3.5 inches, and more preferably, in a range of 2.75 to 3 inches. The handle length (A to C) is about 5.8 inches and the overall length of the snips (A to E) is in a range of about 10.5 to 11.25 inches. The length of the blades from the blade pivot 50 to the blade tips 52, 56, (D–E) is at least 3.75 inches. The range of motion of the handles is in a range of 40° to 50° and about 4 to 5 inches of relative movement of the handle butts between the open (K to L) and closed positions (H to J) of the snips. An axial distance between the handle pivot 24 and the blade pivot 50 (C to D) is preferably about 0.75 inches. An axial distance (B to E) between the points 40, 42 where the blades are mounted to the handles to the tips of the blades 52, 54 is preferably about 5.88 inches. The blade tips 52, 54 have a maximum opening distance, measured perpendicular to the snips axis, of about 1.56 inches for a blade length of 3.88 inches.

The snips in accordance with the invention provide efficiencies in the cutting action not found in the art. For example, for a cutting length of 2.75 inches, the snips have a ratio of cutting length to overall snips length of 0.26 and a ratio of cutting length to handle length of 0.47. The ratio of the cutting length to the angular range of motion of the handles, which indicates the length of cut provided for each incremental change as the handles converge is about 0.07 inches/degree for a handle range of movement of 40°.

Snips in accordance with the invention have a ratio of cutting length to overall snips length of at least 0.24, and preferably in a range of about 0.24 to 0.33. The snips have a ratio of cutting length to handle length of at least 0.4 and preferably in a range of about 0.4 to 0.6. In addition, the ratio of the cutting length to the angular range of motion of the handles is at least 0.05 and preferably in a range of about 0.05 to 0.09 inches/degree for a handle range of movement of 40° to 50°. These features of the snips of the present invention provide snips that are less fatiguing to use and provide more efficient cutting action without significant loss of mechanical advantage.

By contrast, conventional compound action snips have been found to have a cutting length to snips length ratio of less than 0.16, and a ratio of cutting length to handle length of less than 0.24. Further, the ratio of cutting length for degree of movement of the handles in conventional compound action snips has been found to be less than 0.04.

Figure 4:
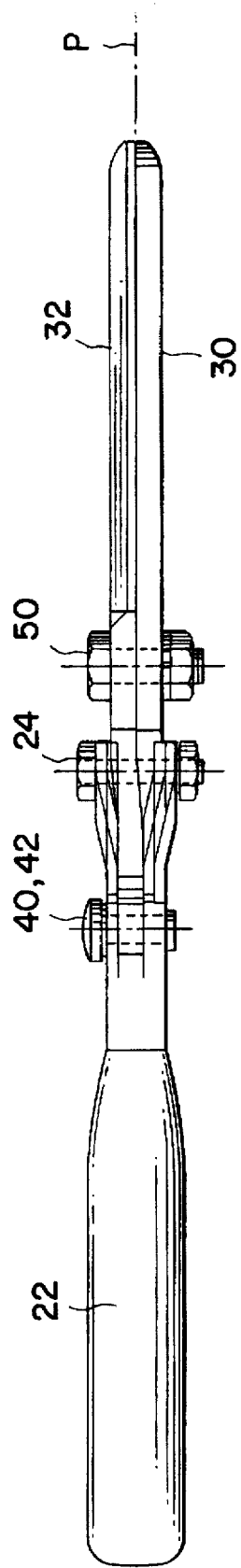
FIG. 4 is a side view of the snips of FIG. 1.

As indicated in FIG. 4, a cutting plane P of the snips is defined as the plane in which the cutting edges 56, 58 of the blades 20, 22 move. According to a preferred embodiment, the cutting edges 56, 58 have an arcuate, convex shape, as shown in FIG. 3. Alternatively, the cutting edges 56, 58 may have uncurved, straight edges.

Figure 5:
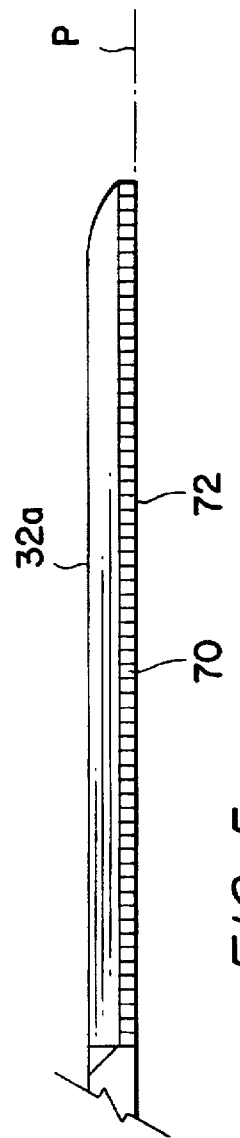
FIG. 5 is an enlarged view of a blade with an anvil surface for supporting a workpiece during cutting.

FIG. 5 shows a view of one blade 32a having a broadened anvil surface 70 oriented perpendicular to the cutting plane P. According to a preferred embodiment of the invention for use in cutting vinyl, a paired blade (not illustrated) is formed as a conventionally honed cutting edge. The anvil surface 70 is serrated which provides increased friction to prevent sliding of the workpiece as the honed cutting edge moves past the edge 72 of the anvil blade 32a during cutting. This arrangement is advantageous for cleanly cutting material such as vinyl siding.

Alternatively, the snips according to the invention may be configured to have an anvil arrangement as described in commonly-owned U.S. Pat. No. 5,003,695 to Lipscomb et al., the disclosure of which is incorporated herein by reference.

The foregoing has described the principles, features, embodiments and modes of operation of the present invention. The invention, however, should not be construed as limited to the described embodiments, rather, the description is illustrative, and it should be appreciated that the variations, modifications and equivalents may be made by others without departing from the scope of the invention as defined in the following claims.

I claim:

1. Compound action cutting snips, comprising:
    a pair of handle members mutually connected at a handle pivot at a distal end of the handles, the handle members forming a handle for single hand use; and,
    a pair of cutting blades, each blade having a proximal end attached to a pivot in a distal potion of one of the handles proximal to the handle pivot, and the blades mutually connected at a blade pivot, the handle pivot and blade pivot being located on an axial centerline of the snips, the handle pivot proximal to the blade pivot, so that converging movement of the handles causes converging movement of the blades;
    the blades each having a cutting edge that has a curvature convex in the direction of the centerline of the snips;
    wherein the blades are pivotable between a fully opened position and a closed position, a maximum cutting length being a free length of the blades when in the fully opened position,
    wherein the maximum cutting length is at least 2.5 inches and a ratio of the maximum cutting length to the length of the handles is at least 0.4.

2. The cutting snips of claim 1, wherein the maximum cutting length is in a range of 2.5 to 3.5 inches and the handles have a length of about 5.8 inches.

3. The cutting snips of claim 1, wherein a ratio of the maximum cutting length to the length of the handles is in a range of about 0.4 to 0.6.

4. The cutting snips of claim 1, wherein the blade length is at least 3.75 inches and the handles have a length of about 5.8 inches.

5. The cutting snips of claim 1, wherein a first of the blades is formed with an anvil surface substantially perpendicular to a cutting plane and a second of the blades is formed with a honed cutting edge.

6. The cutting snips of claim 5, wherein the first blade includes serrations on the anvil surface.

7. A compound action cutting snips, comprising:

a pair of handles mutually connected at a handle pivot at distal ends of the handles, the handles forming a grip for a hand having a predetermined angular range of movement between an open position and a converged position; and a pair of cutting blades, each blade having a proximal end attached to a distal portion of one of the handles and proximal to the handle pivot, and the blades mutually connected at a blade pivot to form a cutting length from free ends of the blades to a crossing point, so that converging movement of the handles causes converging cutting movement of the blades;

wherein a ratio of a maximum cutting length of the blades to a length of the handles is about 0.4, wherein the handles have a range of movement of about 45° through a distance at proximal ends of the handles of about 4.5 inches; and wherein a change in cutting length caused by the converging movement of the handles is at least 0.05 inches/degree.

8. The cutting snips of claim 7, wherein the blades having a maximum cutting length of at least 2.5 inches.

9. The cutting snips of claim 7, wherein the blades have a maximum cutting length in a range of 2.5 to 3.5 inches and wherein the change in effective cutting length to the angular movement of the handles is in a range of 0.05 to 0.09 inches/degree.

10. The cutting snips of claim 7 wherein a first of the blades is formed with an anvil surface and a second of the blades is formed with a honed cutting edge.

11. The cutting snips of claim 10, wherein the first blade includes serrations on the anvil surface.

12. A compound action cutting snips, comprising:

a pair of handles mutually connected at a handle pivot for pivoting movement between an open position and a closed position, a distance between the open and closed positions being in a range of about 4 inches to 5 inches for manipulation in one hand; and, a pair of cutting blades, each blade having a proximal end attached to a distal portion of one of the handles, the blades being mutually connected at a blade pivot for pivoting movement between an open position and a closed position, and the blades having a maximum cutting length at the open position;

wherein the handle pivot is proximal to the blade pivot;

wherein converging movement of the handles causes converging movement of the blades, and, wherein a ratio of the maximum cutting length of the blades to a distance between the open and closed position of the handles measured at handle butts is at least 0.5.

13. The cutting snips of claim 12, wherein the ratio of the maximum cutting length of the blades to a distance between the open and closed position of the handles measured at handle butts is in a range of 0.5 to 0.9.

14. The cutting snips of claim 12, wherein the ratio of the maximum cutting length of the blades to the distance between the open and closed positions of the handles measured at the handle butts is about 0.6.

15. The cutting snips of claim 12, wherein the maximum cutting length is in a range of 2.5 to 3.5 inches.

16. The cutting snips of claim 12, wherein a first blade is formed with an anvil surface and a second blade is formed with a straight cutting edge.

17. Compound action cutting snips for single-hand use, comprising:

a pair of handles mutually connected at a fixed handle pivot at a distal end of the handles, the handles having a length measured from the handle pivot to a butt end in a range of 5.7 to 6 inches; and, a pair of cutting blades, each blade having a proximal end attached to a pivot in one of the handles proximal to the handle pivot, the blades being mutually connected at a fixed blade pivot, the blades having a length measured from the blade pivot to a tip end of at least 3.75 inches, the handle pivot and blade pivot being located on an axial centerline of the snips, the handle pivot being proximal to the blade pivot, so that converging movement of the handles causes converging movement of the blades;

the blades each having a cutting edge that has a curvature convex in the direction of the centerline of the snips;

wherein the blades are pivotable between a fully opened position and a closed position, a maximum cutting length being a free length of the blades when in the fully opened position, the maximum cutting length being at least 2.5 inches.

* * * * *

UNITED STATES PATENT AND TRADEMARK OFFICE
CERTIFICATE OF CORRECTION

PATENT NO. : 5,699,617

DATED : December 23, 1997

INVENTOR(S) : Mel C. MOCK

It is certified that error appears in the above-identified patent and that said Letters Patent is hereby corrected as shown below:

In column 4, line 40, delete "potion" and insert --portion--.

Signed and Sealed this

Tenth Day of March, 1998

Attest:

BRUCE LEHMAN

*Attesting Officer*  *Commissioner of Patents and Trademarks*